US010824276B2

(12) United States Patent
Reynolds

(10) Patent No.: US 10,824,276 B2
(45) Date of Patent: Nov. 3, 2020

(54) DISPLAY DEVICE WITH INTEGRATED FINGERPRINT SENSOR

(71) Applicant: SYNAPTICS INCORPORATED, San Jose, CA (US)

(72) Inventor: Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/450,539

(22) Filed: Jun. 24, 2019

(65) Prior Publication Data

US 2020/0192522 A1 Jun. 18, 2020

Related U.S. Application Data

(60) Provisional application No. 62/779,932, filed on Dec. 14, 2018.

(51) Int. Cl.
*G06F 3/042* (2006.01)
*G06F 3/041* (2006.01)
*G06F 21/32* (2013.01)
*H03K 17/94* (2006.01)

(52) U.S. Cl.
CPC .......... *G06F 3/0421* (2013.01); *G06F 3/0412* (2013.01); *G06F 21/32* (2013.01); *H03K 17/941* (2013.01)

(58) Field of Classification Search
CPC .. G06K 9/0004; G09G 3/3233; G06F 3/0412; G06F 3/0421; G06F 21/32
See application file for complete search history.

(56) References Cited

U.S. PATENT DOCUMENTS

| | | | |
|---|---|---|---|
| 8,026,876 B2 | 9/2011 | Nathan et al. | |
| 8,319,712 B2 | 11/2012 | Nathan et al. | |
| 9,058,775 B2 | 6/2015 | Nathan et al. | |
| 9,280,933 B2 | 3/2016 | Chaji et al. | |
| 9,786,209 B2 | 10/2017 | Chaji et al. | |
| 2010/0225938 A1 | 9/2010 | Nara | |
| 2019/0279566 A1* | 9/2019 | Wang | H01L 27/3244 |
| 2019/0384959 A1* | 12/2019 | Lee | G06K 9/0004 |

* cited by examiner

*Primary Examiner* — Xuemei Zheng
(74) *Attorney, Agent, or Firm* — Patterson + Sheridan, LLP

(57) ABSTRACT

A fingerprint sensing device integrated within a display device. The display device comprises source lines, monitor lines, gate lines, select lines, and subpixels. A first subpixel comprises first subpixel circuitry coupled to a first source electrode, a first monitor line, and a first gate line, and a first photodiode circuitry coupled to a first select line. The display device further comprises measurement circuitry coupled to the first subpixel via the first monitor line. The measurement circuitry is configured to receive a first current signal from the first subpixel circuitry during a first period via the first monitor line, receive a second current signal from the first photodiode circuitry during a second period via the first monitor line, and determine fingerprint data from the second current signal.

20 Claims, 8 Drawing Sheets

DISPLAY DEVICE WITH INTEGRATED FINGERPRINT SENSOR

CROSS REFERENCE

This application claims the benefit of U.S. provisional patent application Ser. No. 62/779,932, filed on Dec. 14, 2018 entitled "Display Device With Integrated Fingerprint Sensor", which is herein incorporated by reference in its entirety.

BACKGROUND

Field

Embodiments disclosed herein generally relate to electronic devices, and more specifically, to fingerprint sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop, computers. Proximity sensor devices may also often be used in smaller computing systems, such as touch screens integrated in cellular phones.

SUMMARY

In one embodiment, a display device comprises a plurality of source lines, a plurality of monitor line, a plurality of gate lines, a plurality of select lines, and a plurality of subpixels. A first subpixel of the plurality subpixels comprises first subpixel circuitry coupled to a first source electrode of the plurality of source lines, a first monitor line of the plurality of monitor lines, and a first gate line of the plurality of gate lines, and a first photodiode coupled to a first select line of the plurality of select line. The display device further comprises measurement circuitry coupled to the first subpixel via the first monitor line. The measurement circuitry is configured to receive a first current signal from the first subpixel circuitry during a first period via the first monitor line, receive a second current signal from the first photodiode during a second period via the first monitor line, and determine fingerprint data from the second current signal.

In one embodiment, a display driver for a display device comprises display driver circuitry and measurement circuitry. The display driver circuitry is coupled to a plurality of subpixels of the display device via a plurality source lines. Further, the display driver is configured to drive subpixel data signals onto the plurality of subpixels via the plurality of source lines to update the plurality of subpixels. The measurement circuitry is coupled to the plurality of subpixels and a plurality of photodiodes via a plurality of monitor lines. Each of the plurality of photodiodes corresponds to a respective one of the plurality of subpixels. The measurement circuitry is configured to receive a first current signal from a first subpixel of the plurality of subpixels during a first period via a first monitor line of the plurality of monitor lines, and receive a second current signal from a first photodiode of the plurality of photodiodes during a second period via the first monitor line.

In one embodiment, a method for performing fingerprint sensing comprises selecting a first photodiode of a first subpixel a display device for readout during a first period by driving a first select line coupled to the first photodiode with a select signal, receive a first current signal from the first photodiode via a first monitor line coupled to the first photodiode, wherein the first monitor line is further coupled to first subpixel circuitry of the first subpixel, and determine fingerprint information of a first input object from a measurement of the first current signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
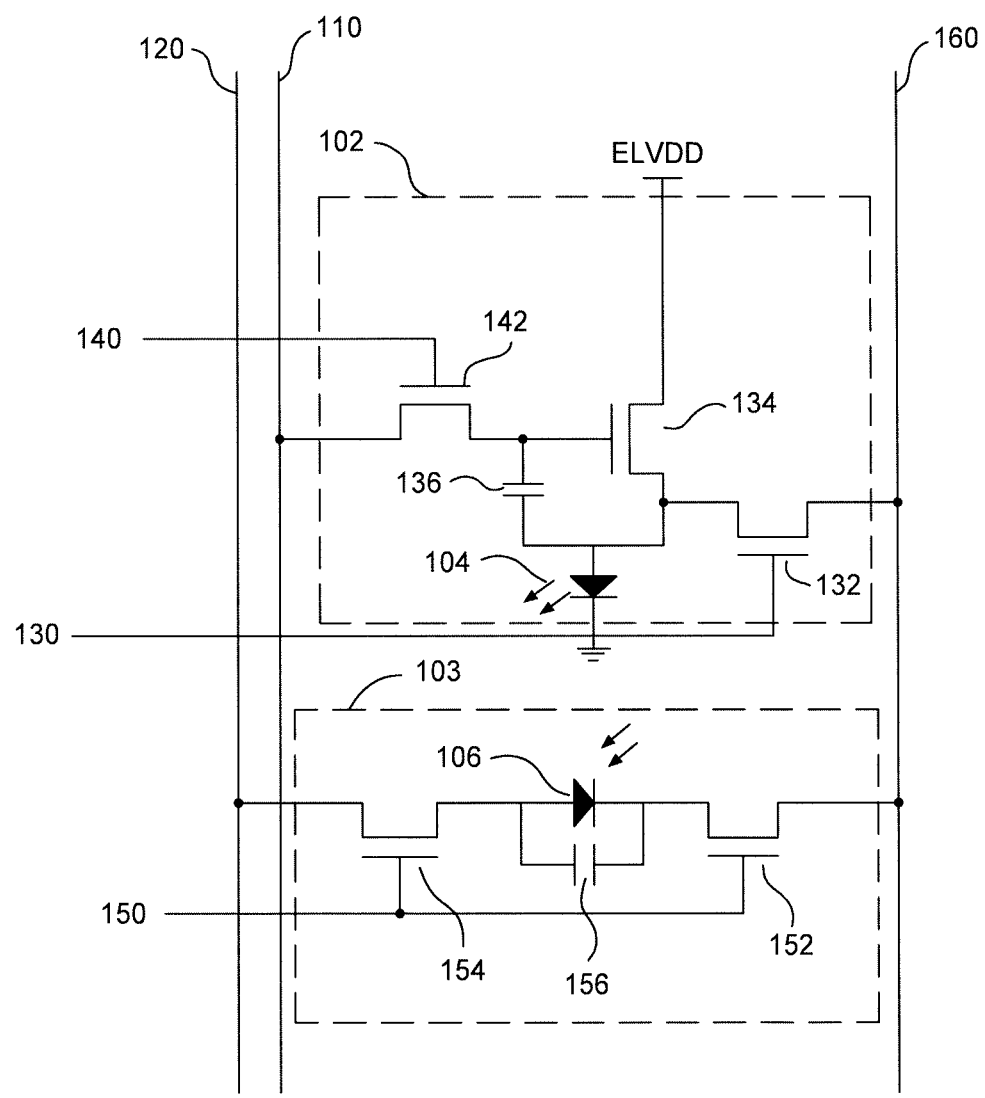
FIG. 1 is a schematic diagram of a subpixel of a display device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

FIG. 1 illustrates a subpixel 100 of a display device having an integrated fingerprint sensing device, according to one or more embodiments. The subpixel 100 may include subpixel circuitry 102 and photodiode circuitry 103. The subpixel circuitry 102 may include select transistors 142 and 132, a drive (or source) transistor 134 and a storage capacitor 136. The subpixel circuitry 102 may further include one or more electrodes of an organic light emitting diode (OLED) 104. For example, the subpixel circuitry 102 may include an anode electrode which forms one electrode of the OLED 104. A cathode electrode may be disposed opposing the anode electrode such that organic material may be positioned between the anode electrode and cathode electrode, forming the OLED 104. For simplification of illustration and description, the OLED 104 is illustrated as a complete OLED in FIG. 1. The transistors may be formed as TFT (Thin Film Transistors) on a rigid (e.g. glass) or flexible (e.g. Polyimide) substrate and formed in semiconductor materials such as LTPS (Low Temperature Poly Silicon), amorphous Silicon, Oxide Semiconductors (e.g. Indium Gallium Zinc Oxide—IGZO), and the like.

The select transistor 142 may be coupled to a gate line 140 and a source line 110. Further, the select transistor 142 may to control the flow of current onto the anode electrode of the OLED 104. For example, as the gate of the select transistor 142 is coupled to the gate line 140, when the gate line 140 is driven with a gate select signal, the select transistor 142 turns on and current is permitted to flow onto the anode electrode of the OLED 104 according to the data signal applied to the source line 110. The gate select signal may be referred to as a voltage gate high signal, $V_{GH}$, and includes a voltage that is at least as high as the turn on voltage for the select transistor 142. Further, a gate deselect signal may be utilized to turn off the select transistor 142. The gate deselect signal may be referred to as a voltage gate low signal, $V_{GL}$, and includes a voltage that is below the turn on voltage for the select transistor 142. The voltage value of the gate select signal may be higher than the voltage value of the gate deselect signal (e.g. for n-channel FETs). Further, the voltage value of the gate select signal may be positive and the voltage value of the gate deselect signal may be negative. In one or more embodiments, the voltage value of the gate select signal is at least about 15 V and the voltage value of the gate deselect signal is about −10V or less. Alternatively, the select transistor 142 may be configured to turn on in response to the gate line 140 being driven with a gate select signal that has a voltage value that is less than the gate deselect signal. Alternatively, p-channel FETs may be used, which have reversed select signals and threshold voltages.

The select transistor 132 may be coupled between a monitor line 160 and the OLED 104. For example, the select transistor 132 may be coupled between the monitor line 160 and the anode electrode of the OLED 104. Further, the gate of the select transistor 132 may be coupled to a select line 130. The select transistor 132 may electrically couple and decouple the OLED 104 with monitor line 160 in response to a monitor select and a monitor deselect signal driven onto the select line 130. For example, driving the select line 130 with a monitor select signal may turn on the select transistor 132, allowing current to flow onto the monitor line 160. Further, when the select line 130 is driven with a monitor deselect select signal, the select transistor 132 may be turned off, electrically disconnecting the subpixel from the monitor line 160. The monitor select signal may include a voltage that is at least as high as the turn on voltage for the select transistor 132. The monitor deselect signal may include a voltage that is below the turn on voltage for the select transistor 132. The voltage value of the monitor select signal may be higher than the voltage value of the monitor deselect signal. Alternatively, the select transistor 132 may be configured to turn on in response to the select line 130 being driven with a monitor select signal that has a voltage value that is less than the monitor deselect signal.

The storage capacitor 136 may be configured to drive the OLED 104 when the OLED 104 is disconnected from the source line 110. Further, the drive transistor 134 controls the flow of current onto the OLED 104. For example, the drive transistor 134 may control the flow of current onto an anode electrode of the OLED 104 dependent on the voltage on storage capacitor 136.

The photodiode circuitry 103 includes photodiode 106, photodiode select transistors 152, 154 and a storage capacitor 156. The photodiode 106 may be configured to receive light reflected by an input object and convert the received light into a current signal which may be stored on the storage capacitor 156. For example, the subpixel 100 may be part of a fingerprint sensing device, and the reflected light due to an input object that is proximate the input device. The photodiode 106 may be referred to as a photodetector or a photo-sensor.

The photodiode 106 may be any device that is configured to generate a current signal from received light such that it stores charge indicative of total illumination on storage capacitor 156. In one embodiment the photodiode 106 may comprise an a-Si (amorphous Silicon) photodiode, an organic photodiode, or the like deposited on the TFT substrate. As illustrated in FIG. 1, the photodiode 106 is coupled between a bias line 120 via the photodiode select transistor 154 and to the monitor line 160 via the photodiode select transistor 152. In one or more embodiments, when the photodiode select transistors 152, 154 are driven with a photodiode select signal, the photodiode select transistors 152, 154 turn on and current flows from the photodiode 106 onto the monitor line 160. In one embodiment, the bias line 120 and the monitor line 160 may be driven with a common voltage during a period of time overlapping with when the photodiode select transistors 152, 154 are turned on. Alternatively, the bias line 120 and the monitor line 160 may be driven with different voltages during a period of time overlapping with when the photodiode select transistors 152, 154 are turned on. Further, driving the photodiode select transistors 152, 154 with a photodiode deselect signal via select line 150 turns off the photodiode select transistors 152, 154, and the photodiode 106 is electrically disconnected from the bias line 120 and the monitor line 160. The photodiode select signal may have a voltage value greater than that of the photodiode deselect signal. Alternatively, the photodiode select transistors 152, 154 may be configured to turn on in response to the select line 150 being driven with a photodiode select signal having a voltage value less than that of the photodiode deselect signal (e.g. in the case of n-channel FETs). In one or more embodiments, the photodiode 106 may be coupled to a monitor line of another subpixel instead of bias line 120. Further, each photodiode select transistor 152, 154 may be coupled to independent select lines. In one embodiment, the transistors 152, 154 are coupled to the gate line of another display line or through more complex logic (e.g. a wired-and circuit including both a row gate select and column photodiode select).

The storage capacitor 156 integrates the output current of the photodiode 106 during an integration period. For example, the storage capacitor 156 stores a charge corresponding to the amount of light received by the photodiode 106. In one or more embodiments, the integration period may correspond to a fraction of the display refresh rate, e.g., the rate at which each of the subpixels is updated. In one embodiment, the display refresh rate is about 60 Hz and a length of the display frame during which each subpixel is updated is about 16 ms. Accordingly, the integration period for the storage capacitor 156 is at least 16 ms or a multiple of 16 ms. In other embodiments, other display refresh rates and corresponding integration periods may be utilized. Further, in one or more embodiments, the photodiode circuitry 103 may be read out multiple times during a display frame. In such embodiments, the integration time of the storage capacitor 156 is shorter than a display frame. For example, if the photodiode circuitry 103 is readout twice per display frame, and the display refresh rate is 60 Hz, the integration time of the storage capacitor 156 may be about 8 ms.

Figure 2A:
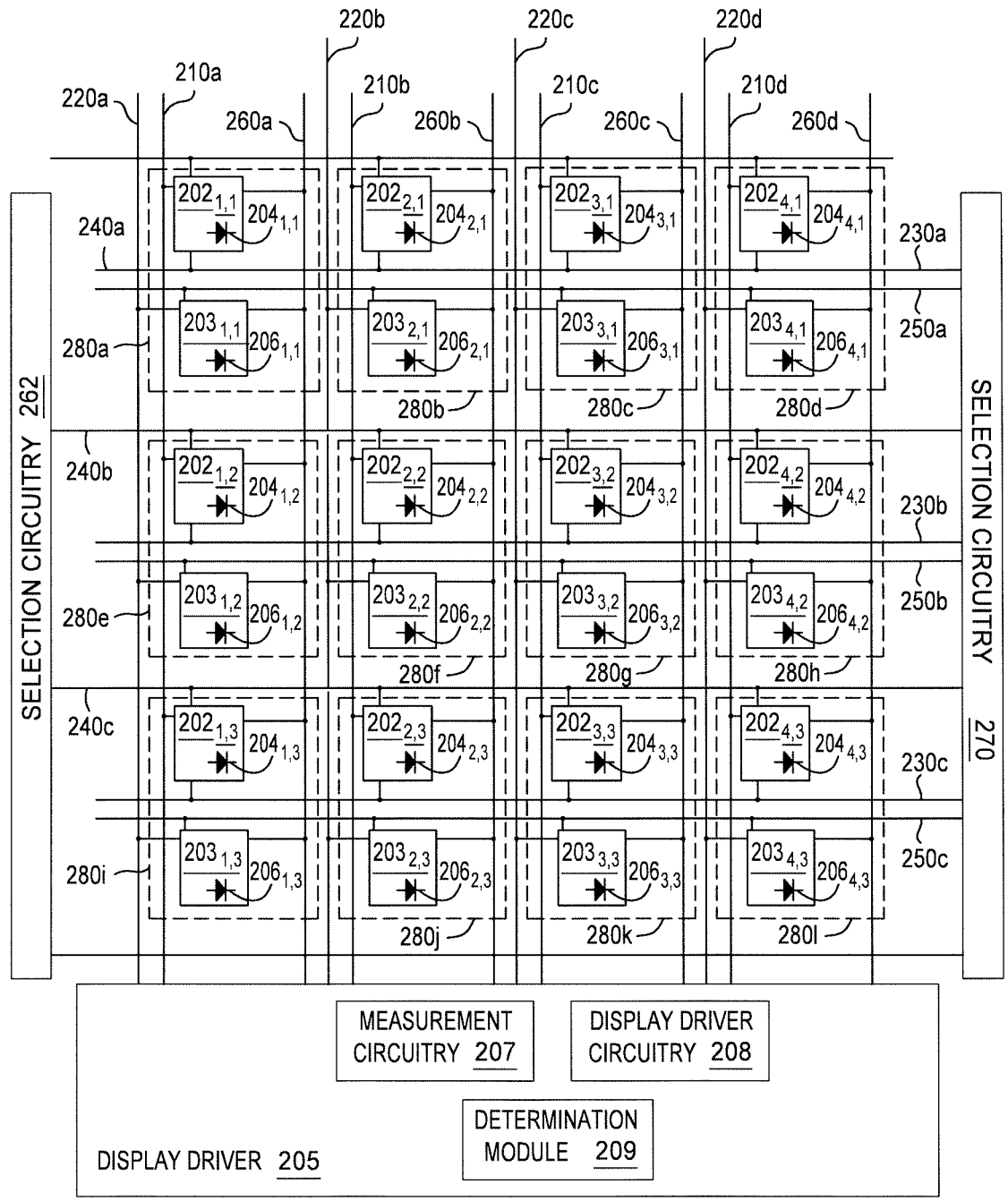
FIG. 2A illustrates an example display device, according to one or more embodiments.

The bias line 120, the source line 110, and the monitor line 160 may be coupled to a display driver. For example, as shown in FIG. 2, the bias line 120, the source line 110, and the monitor line 160 may be coupled to the display driver 205 of FIG. 2. Further, the gate line 140 may be coupled to the selection circuitry. For example, as shown in FIG. 2, the gate line 240 may be coupled to the selection circuitry 262. The select lines 130 and 150 may be coupled to the same selection circuitry as the gate line 140, e.g., selection circuitry 262. Alternatively, the gate line 140 may be coupled to first selection circuitry, e.g., selection circuitry 262, and the select lines 130 and 150 may be coupled to the second selection circuitry 270. Further, the gate line 140, the select line 130, and the select line 150 may be each coupled to different selection circuitries.

FIG. 2 illustrates a display device 200 comprising an integrated fingerprint sensing device, according to one or more embodiments. As illustrated in the embodiment of FIG. 2, the display device 200 includes a display driver 205, selection circuitry 262 and selection circuitry 270, gate lines 240a-240c, select lines 230a-230c and 250a-250c, source lines 210a-210c, bias lines 220a-220e, monitor lines 260a-260d, and subpixels 280a-280l. Further, each of the subpixels 280 includes subpixel circuitry 202 having a corresponding OLED 204 and photodiode circuitry 203 having a corresponding photodiode 206. The subpixels 280 may be configured similar to that of the subpixel 100 as described in relation to FIG. 1. For example, the subpixel circuitry 202 of each subpixel 280 may include one or more selection transistors 132, 142 and driving transistors 134 as depicted in FIG. 1. Further, the photodiodes 206 may configured similar to that of photodiode 106 of FIG. 1. For example, each photodiode 206 may be coupled to a respective monitor line 260 via a photodiode select transistor 152 and to a bias line 220 via a photodiode select transistor 154 as depicted in FIG. 1.

The display driver 205 may be configured to update the subpixels 280 during display frames. During each display frame, each of the subpixels 280 may be updated, updating an image displayed by the display device 200. The rate at which the display frames are updated may be referred to a display frame rate. The display frame rate maybe 60 Hz. In other embodiments, the display fame rate may be greater than or less than 60 Hz.

The subpixels 280 may be disposed as an array having a plurality of columns and rows. For example, FIG. 2 illustrates 3 different rows of subpixels 280. The 3 different rows include a first row corresponding to the subpixels 280a-280d, a second row corresponding to the subpixels 280e-280h, and a third row corresponding to the subpixels 280i-280l. Further, FIG. 2 illustrates 5 columns of subpixels 280. The 4 different columns include a first column corresponding to the subpixels 280a, 280e, and 280i, a second column corresponding to the subpixels 280b, 280f, and 280j, a third column corresponding to the subpixels 280c, 280g, and 280k, and a fourth column corresponding to the subpixels 280d, 280h, and 280l.

Each row of the subpixels 280 may be coupled to one or more gate lines 240. For example, as is illustrated in FIG. 2, each row of the subpixels 280 is coupled to a different one of gate lines 240. Alternatively, one or more rows of the subpixels 280 may be coupled to two or more gate lines 240. Further, each subpixel 280 of a common row of the subpixels 280 may be coupled to a different one of the source lines 210. For example, the subpixel 280a may be coupled to the source line 210a, and the subpixel 280b may be coupled to the source line 210b. Further, two more subpixels 280 of a column may be coupled to a common source lines 210. For example, the subpixels 280a and subpixels 280e may be coupled to the source line 210a.

Each subpixel 280 of the display device 200 may include a photodiode circuitry 203. Alternatively, in one or more embodiments, only a portion of the subpixels 280 may include corresponding photodiode circuitry 203. For example, only the subpixels 280 in a specified input area may include corresponding photodiode circuitry 203. The input area may correspond to a fingerprint input area or any other type of input area. Further, every "N" subpixels 280 in a common row and every "M" subpixels 280 in a common column may include corresponding photodiode circuitry 203, where "N" and "M" are greater than 1 and may be equal to or different from each other.

The selection circuitry 262 may be coupled to the gate lines 240. Further, the selection circuitry 262 may drive gate select and deselect signals onto the gate lines 240 to activate and deactivate corresponding subpixels 280 for updating. While a single selection circuitry 262 is illustrated in FIG. 2, in various embodiments, the display device 200 may include more than one selection circuitry 262, where each selection circuitry is configured to be coupled to different ones of the gate lines 240.

The selection circuitry 270 may be coupled to the subpixel circuitries 202 via select lines 230 and to the photodiode circuitries 203 via select lines 250. Further, the selection circuitry 270 may be configured to drive monitor select signals and monitor deselect signals onto the select lines 230 to active and deactivate corresponding subpixel circuitries 202 for monitoring. Activating the subpixel circuitry 202 for monitoring may include electrically coupling the subpixel circuitry 202 of a subpixel 280 to a corresponding monitor line 260 such that a current signal may be provided from the subpixel circuitries 202 onto corresponding monitor lines 260 and to the display driver 205. Further, deactivating the subpixel circuitries 202 may include electrically disconnecting the subpixel circuitries 202 from corresponding monitor lines 260 such that current is not able to flow from the subpixel circuitries 202 onto corresponding the monitor lines 260 and to the display driver 205.

The selection circuitry 270 may be further configured to drive photodiode select and deselect signals onto the photodiode circuitries 203 via select lines 250, to activate and deactivate the photodiodes 206 for readout. Activating the photodiodes 206 for readout may include electrically coupling the one or more photodiodes 206 to corresponding bias lines 220 and monitor lines 260 such that a current signal may be provided from the photodiodes 206 to the display driver 205. Further, deactivating the photodiodes 206 includes electrically disconnecting one or more photodiodes 206 from corresponding bias lines 220 and monitor lines 260 such that current is not able to flow from the photodiodes 206 to the display driver 205.

The display driver 205 may include measurement circuitry 207 and display driver circuitry 208. Further, the display driver 205 may be disposed as part one or more integrated circuit (IC) chips. For example, at least a portion of the measurement circuitry 207 and at least a portion of the display driver circuitry 208 may be disposed as part of a common IC chip. Alternatively, at least a portion of the measurement circuitry 207 may be disposed as part of a first IC chip and a least a portion of the display driver circuitry 208 may be disposed as part of a second IC chip.

The display driver circuitry 208 may be configured to drive display subpixel update signals onto the subpixels 280 via the source lines 210. Driving the subpixels 280 with the subpixel update signals may comprise driving the anode electrode of the corresponding OLED 204 to a particular voltage value to set a brightness of the OLEDs 204. The brightness of each OLED 204 may correspond to the voltage difference between the anode electrode and a cathode electrode.

The display driver circuitry 208 may be coupled to each subpixel 280 via one of the source lines 210. Further, the display driver circuitry 208 may drive display subpixel update signals onto selected subpixels 280 via the source lines 210a. Driving the subpixels 280 with the subpixel update signals may drive the anode electrode of the corresponding OLED 204 to a particular voltage value. The brightness of each OLED 204 may correspond to the voltage difference between the anode electrode and a cathode electrode.

The display driver circuitry 208 may also be coupled to the photodiode circuitry 203 of each subpixel 280 via bias line 220. The display driver circuitry 208 may drive a bias voltage onto each photodiode 206 to place the photodiode 206 at a known voltage before the corresponding current signal is readout by the measurement circuitry 207 and to reduce interference introduced by fluctuations of a ground of the display device 200. In one embodiment, the display driver circuitry 208 drives a first voltage on a monitor line 260 and a second voltage different from the first voltage on a corresponding bias line 220.

Further, each photodiode circuitry 203 of a common row may be coupled to a different bias line 220, and two or more photodiode circuitries 203 of a common column may be coupled to a common bias line 220. For example, the photodiodes $206_{1,1}$ and $206_{2,1}$ may be coupled to the bias lines 220a and 220b, respectively. Further, the photodiodes $206_{1,1}$ and $206_{2,1}$ may be coupled to the bias line 220a.

The display driver circuitry 208 may include one or more source drivers, each coupled to one or more of the source lines 210. Each source driver may be may be coupled to an individual source lines 210, or each of source drivers may be coupled to two or more source lines via respective multiplexers. The multiplexers may be internal to or external to the display driver 205.

The measurement circuitry 207 may be coupled to the subpixels 280 via monitor lines 260. For example, the measurement circuitry 207 may be coupled to the subpixel circuitry 202 and the photodiode 206 of a subpixel 280 via the same monitor line 260. Further, subpixels 280 in a common column may be coupled to a common monitor line 260. For example, the subpixel circuitry $202_{1,1}$ and the photodiode $206_{1,1}$ of the subpixel 280a and the subpixel circuitry $202_{1,2}$ and the photodiode $206_{1,2}$ of the subpixel 280f may be coupled to the monitor line 260a. Further, the measurement circuitry 207 may be coupled to the subpixels 280 in a common row via different monitor lines. For example, the subpixel circuitry $202_{1,1}$ and the photodiode $206_{1,1}$ of the subpixel 280a may be coupled to monitor line 260a and the subpixel circuitry $202_{2,1}$ and the photodiode $206_{2,1}$ of the subpixel 280b may be coupled to the monitor line 260b.

The measurement circuitry 207 may be configured to receive current signals from the subpixel circuitry 202 and/or accumulated charge on the photodiodes 206 via the monitor lines 260. In one or more embodiments, the measurement circuitry 207 is configured to receive the current signal from subpixel circuitry $202_{1,1}$ during a first period and a second current signal representative of accumulated charge from photodiode $206_{1,1}$ during a second period. The received current signals may be accumulated (e.g. onto a capacitor) or filtered over a period of time. In response, a substantially constant current may be estimated by the same circuitry as a variable current from a fixed charge. The first period and second period are non-overlapping.

In one or more embodiments, the measurement circuitry 207 may be configured to determine one or more display compensation parameters based on the current signals received from the subpixel circuitry 202. For example, as the display device 200 experiences aging, the maximum brightness of the subpixels 280 may decrease. The change in brightness may be due to a decrease in the efficiency of the transistors driving of the OLEDs 204 of each subpixel 280. During display updating, each subpixel 280 is driven with a subpixel data signal that corresponds to the expected brightness level of the subpixel. The expected brightness level may correspond to an expected current flowing onto the OLEDs 204 of each subpixel 280. In one embodiment, the brightness of the OLED 204 decreases corresponding to the amount the current driving each of the OLEDs 204 decreases. Thus, by measuring the current flowing onto the OLEDs 204, and the forward voltage of each OLED 204, the actual brightness of each OLED 204 may be measured and compared to an expected brightness of each OLED 204. A compensation amount may be determined based on the difference between the measured and actual brightness. In one embodiment, the measurement circuitry 207 sets the monitor lines 260 to low impedance and a low voltage to measure the current flowing onto each OLED 204. Further, the measurement circuitry 207 sets the monitor lines 260 to high impedance and a high voltage to measure the forward voltage of each OLED 204 (i.e. the voltage at which current flow rapidly decreases).

In one embodiment, the measurement circuitry 207 increases the voltage of a monitor line 260 until the voltage on the monitor line 260 is greater than the forward voltage of the corresponding OLED 204. In such an embodiment, as the monitor line 260 is at a high impedance, current flows through the corresponding OLED 204 which is measured via the monitor line 260 to determine a measure of the amount of burn-in or lifetime compensation to adjust the corresponding data signal to ensure that the brightness of the OLED 204 is within a threshold of the expected brightness. In one embodiment the current flowing through the drive transistor 134 may be measured once a display frame or once every N display frames, where N is greater than 1. Further, in one embodiment the burn-in or lifetime compensation may be measured once a display frame or once every N display frames, where N is greater than 1. In one embodiment, the current flowing through the drive transistors 134 may be measured during the same display frame as the burn-in or lifetime compensation, or during different display frames.

The measurement circuitry 207 may measure the current driven onto each of the OLEDs 204 via drive transistor, e.g., drive transistor 134, and determine the degree to which each subpixel should be overdriven such that the actual brightness of the OLEDs 204 and the expected brightness of the OLEDs 204 correspond to each other. For example, if the measured current is determined to be less than an expected current, the subpixel data signal driven onto corresponding subpixel may be increased. Increasing the current or voltage of the subpixel data signal to compensate for the decrease in brightness may be referred to as overdriving the subpixels. Further, increasing the subpixel data signal driven by the display driver circuitry 208 may comprises at least one of increasing a voltage level of the subpixel data signal and the length of time the subpixel data signal is driven. In one or more embodiments, the subpixel data signal may be a current signal, and in such embodiments, increasing the subpixel data signal may comprise increasing a current value of the subpixel data signal and/or the length of time the subpixel data signal is driven.

In one embodiment, an offset of the current source of the display driver circuitry 208 is adjusted based on the measured current flowing out of the drive transistor 134. Adjusting the offset of the current source may adjust the data signal driven on the source lines 210. In one or more embodiments, if the current flowing out of the drive transistor 134 is less than an expected voltage, the offset may be increased to increase data signal and the current flowing onto the OLED 104 from the drive transistor 134. In one embodiment, the offset of the current source is adjusted until the measured current flowing out of the drive transistor 134 satisfies a threshold.

Further, the display device 200 may be configured to determine fingerprint information for the input object of a user based on the current signals received from the photodiodes 206. For example, the photodiodes 206 may receive light reflected by an input object proximate the display device 200 and charge a corresponding storage capacitor 156. The storage capacitor 156 of each photodiodes 206 may output a current signal to the measurement circuitry 207 via monitor lines 260, and the measurement circuitry 207 may measure the current signal to determine the amount of light received by each of the photodiodes. The measured current may be utilized to determine one or more features of an input object proximate the display device 200. The features may include a position of an input object, and/or fingerprint data of the input object.

In one or more embodiments, the display device 200 is configured to function as a fingerprint sensing device. The fingerprint sensing device may capture a fingerprint image of a user's finger or fingers using the photodiode circuitry 203. In various embodiments, the fingerprint sensing device may be configured to acquire fingerprint images of a user's fingerprint for authentication of the user. For example, the fingerprint sensing device may use the fingerprint images to grant or reject a user's access to a computing device, e.g., a mobile phone, a tablet, a laptop, a personal computer, or the like.

Each photodiode 206 may be configured to receive reflected light from an input object. The reflected light may correspond to light that is reflected, transmitted or scattered from by features of an input object. For example, the reflected light may corresponds to light that is reflected by valleys and/or ridges of a fingerprint. In various embodiments, while fingerprints are mentioned, "prints" from other types of input objects may be determined. For example, the fingerprint sensing device may be configured to determine a print of a user's palm. In other embodiments, other types of input objects may be imaged and processed. Throughout this document, where fingerprints are mentioned, palm prints and/or prints of other types of input objects may be used in as an alternative. Further, in one or more embodiments, a print may correspond to an image of a contact surface.

In one or more embodiments, the display device 200 may utilize principles of direct illumination of the input object by the OLEDs 204 of the subpixels 280, which may or may not be in contact with an input surface of the sensing area depending on the configuration. Additionally, one or more light guiding structures may be used to direct light to the sensing region. When an input object is proximate to the sensing area, light is reflected from surfaces of the input object, which reflections can be detected by the photodiodes 206 and used to determine fingerprint information or other types of biometric information about the input object. "Fingerprint information" may include fingerprint features such as ridges and valleys and in some cases small features such as pores. Further, fingerprint information may include whether or not an input object is in contact with the input device.

With further reference to FIG. 2, the display driver 205 may be configured to instruct the photodiode circuitries 203 to capture sensor data, process the sensor data to generate one or more fingerprint images, and authenticate a user by matching the fingerprint images with one or more templates stored within a template storage. For example, the display driver 205 may instruct the selection circuitry 270 to select one or more photodiodes 206 for readout. In one or more embodiments, the display driver 205 may provide a clock signal and/or other another control signal or signals to the selection circuitry 270, and the selection circuitry 270 may select one or more photodiodes 206 for readout. For example, the selection circuitry 270 may drive a photodiode select signal onto one or more select lines 250 to select corresponding ones of the photodiodes 206 for readout based on the clock signal or data within a control signal. The selected photodiodes 206 may output a current signal to the measurement circuitry 207 via one of the monitor lines 260.

The measurement circuitry 207 may include one or more current measurement devices. In one embodiment, the measurement circuitry 207 includes one or more current or voltage analog-to-digital converters (ADC) that measures the current signal on the monitor lines 260. Alternatively, the measurement circuitry 207 includes a first measurement element to measure the current signal of the monitor lines 260 provided from the subpixel circuitry 202 and a second measurement element configured to measure the current provided from the photodiode circuitry 203. The first measurement circuitry may include one or more current or voltage ADCs and the second measurement circuitry may include one or more charge conversion ADC, a charge amplifier, or any other charge measurement device. In one embodiment, measurement circuitry 207 includes one or more analog front ends (AFEs). Each AFE may be coupled to a different monitor line 260, or one or more AFEs may be coupled to multiple monitor lines 260 via one or more multiplexers. Further, the measurement circuitry 207 may include one or more filters and/or analog to digital converters (ADCs) configured to process the received current signals.

The display driver 205 may additionally include a determination module 209 configured to receive the current signals from the measurement circuitry and generate fingerprint data. In one embodiment, the determination module 209 may be configured to process the current signals received from the measurement circuitry 207, and generate fingerprint images which may be used for user authentication. For example, the determination module 209 may compare the fingerprint images to one or more templates stored within a non-transient computer-readable storage media, such as a template storage device. Non-limiting examples of non-volatile storage elements include magnetic hard discs, optical discs, floppy discs, flash memories, or forms of electrically programmable memories (EPROM) or electrically erasable and programmable (EEPROM) memories.

The determination module 209 may compare fingerprint images generated from sensor data generated by the measurement circuitry 207 with user templates stored within template to determine whether or not to authenticate a user. When a user is authenticated, the user may be provided with access to an electronic device. The determination module 209 may be also configured to generate user templates from sensor data received with measurement circuitry 207 and store the user templates within a template storage.

Figure 2B:
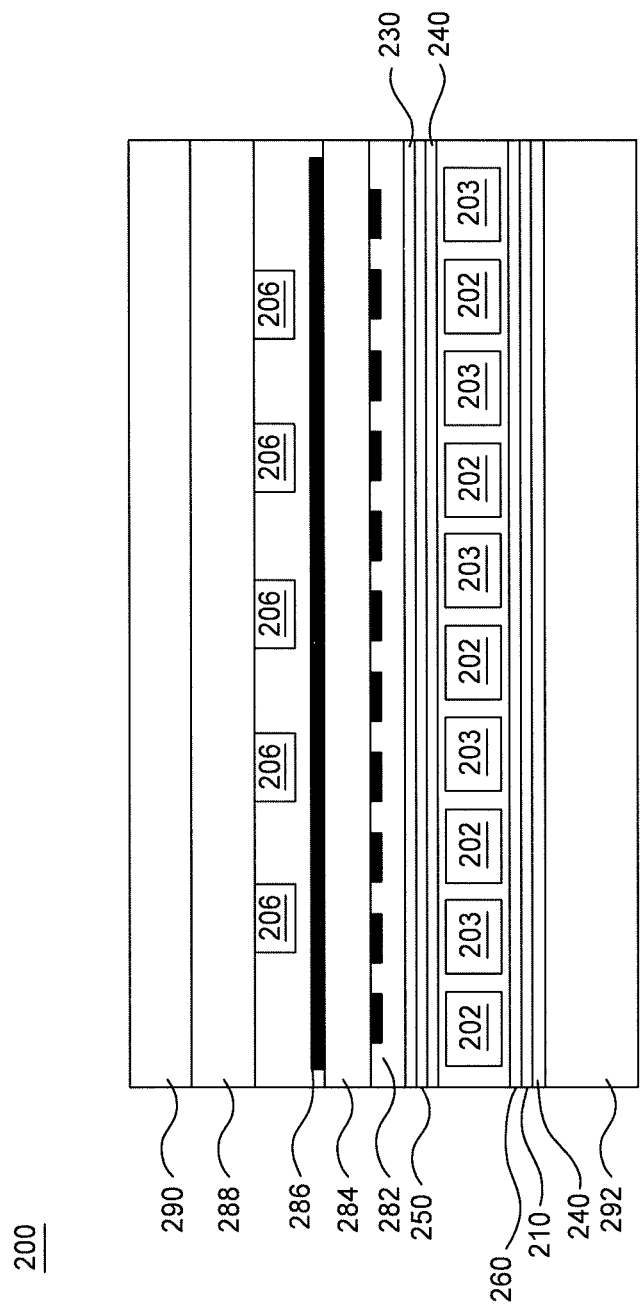
FIG. 2B illustrates a side view of an example display device, according to one or more embodiments.

FIG. 2B is an example partial side view of the display device 200, according to one or more embodiments. In one embodiment, the display device 200 includes a substrate 292, the gate lines 240, the source lines 210, the monitor lines 260, subpixel circuitry 202, the selection lines 230 and 250, anode electrodes 282, organic layers 284, a cathode electrode 286, and display layers 288 and lens 290. Further, the display device 200 includes photodiode circuitry 203 and photodiodes 206. The display layers 288 may include one or more polarizers, substrates and/or other display elements. Further, the gate lines 240, the source lines 210, the monitor lines 260 and the selection lines 230 and 250 may be disposed in different metal layers than as is illustrated in FIG. 2B. For example, the position of one or more of the gate lines 240, the source lines 210, the monitor lines 260 and the selection lines 230 and 250 may differ from what is illustrated in FIG. 2B.

The substrate 292 may be a glass substrate or a plastic substrate. In one embodiment, the substrate 292 is substantially rigid. In other embodiments, the substrate 292 is flexible.

The cathode electrode 286 may be a solid sheet of material that overlaps one or more of the subpixels 280. For example, the display device 200 includes a single cathode electrode 286 that is disposed over each of the subpixels 280. Further, the cathode electrode 286 may be a sheet having a resistance of about 1 to about 10 ohms per square. The cathode electrode 286 may be coupled with and driven by the display driver 205. In one embodiment, the difference in voltage between the cathode electrode 286 and the anode electrode 282 corresponds to a brightness level that is emitted by each subpixel 280. Further, the cathode electrode 286 may be separated from the anode electrodes 282 by one or more organic layers 284, forming the OLEDs 204.

Figure 3:
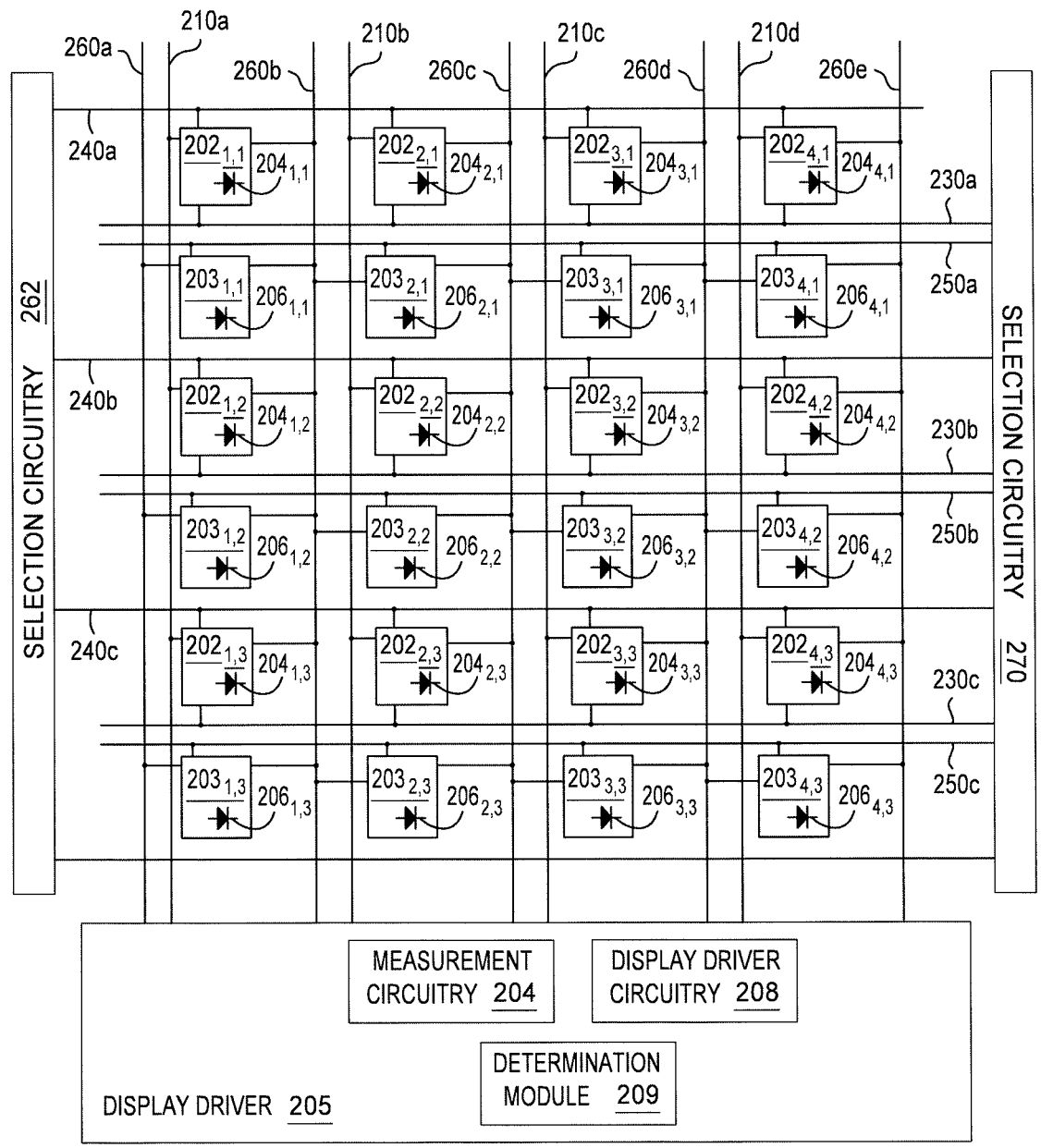
FIG. 3 illustrates an example display device, according to one or more embodiments.

FIG. 3 illustrates a display device 300, according to one or more embodiments. The display device 300 is similar to that of the display device 200, however, the display device 300 lacks the bias lines 220, and instead, each photodiode circuitry 203 of the display device 300 is coupled between two different monitor lines 260.

A first one of the monitor lines 260 may be utilized to drive corresponding photodiodes 206 to a bias voltage while a second one of the monitor lines may be utilized to receive current signals from the photodiodes 206. For example, the display driver circuitry 208 may be configured to drive a bias voltage onto photodiode $206_{2,1}$ via the monitor line 260b and is configured to receive a current signal from photodiode $206_{2,1}$ via the monitor line 260c.

Figure 4:
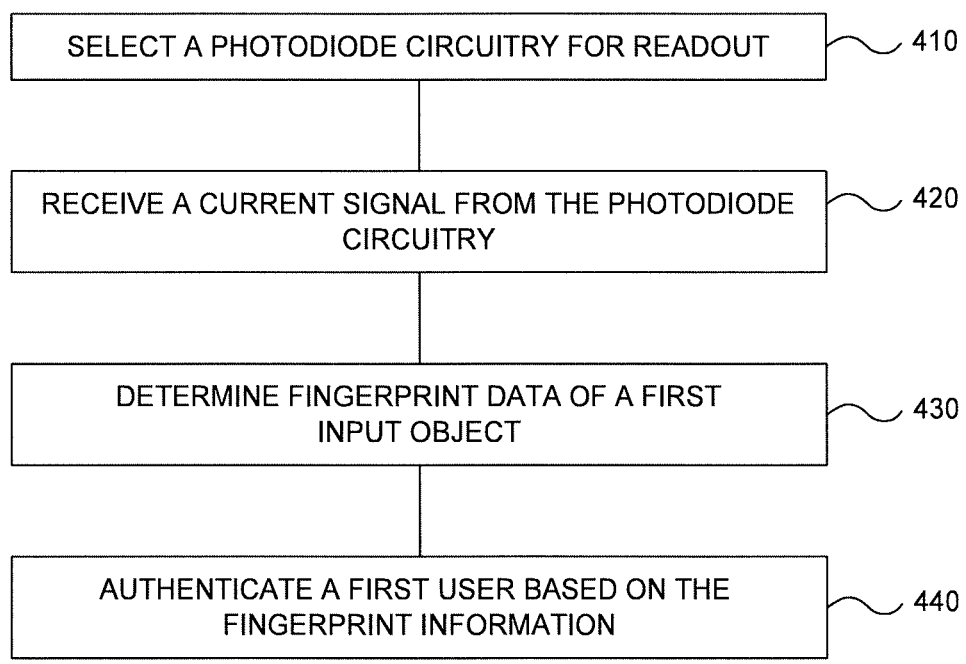
FIG. 4 illustrates a method for fingerprint sensing, according to one or more embodiments.
Figure 6:
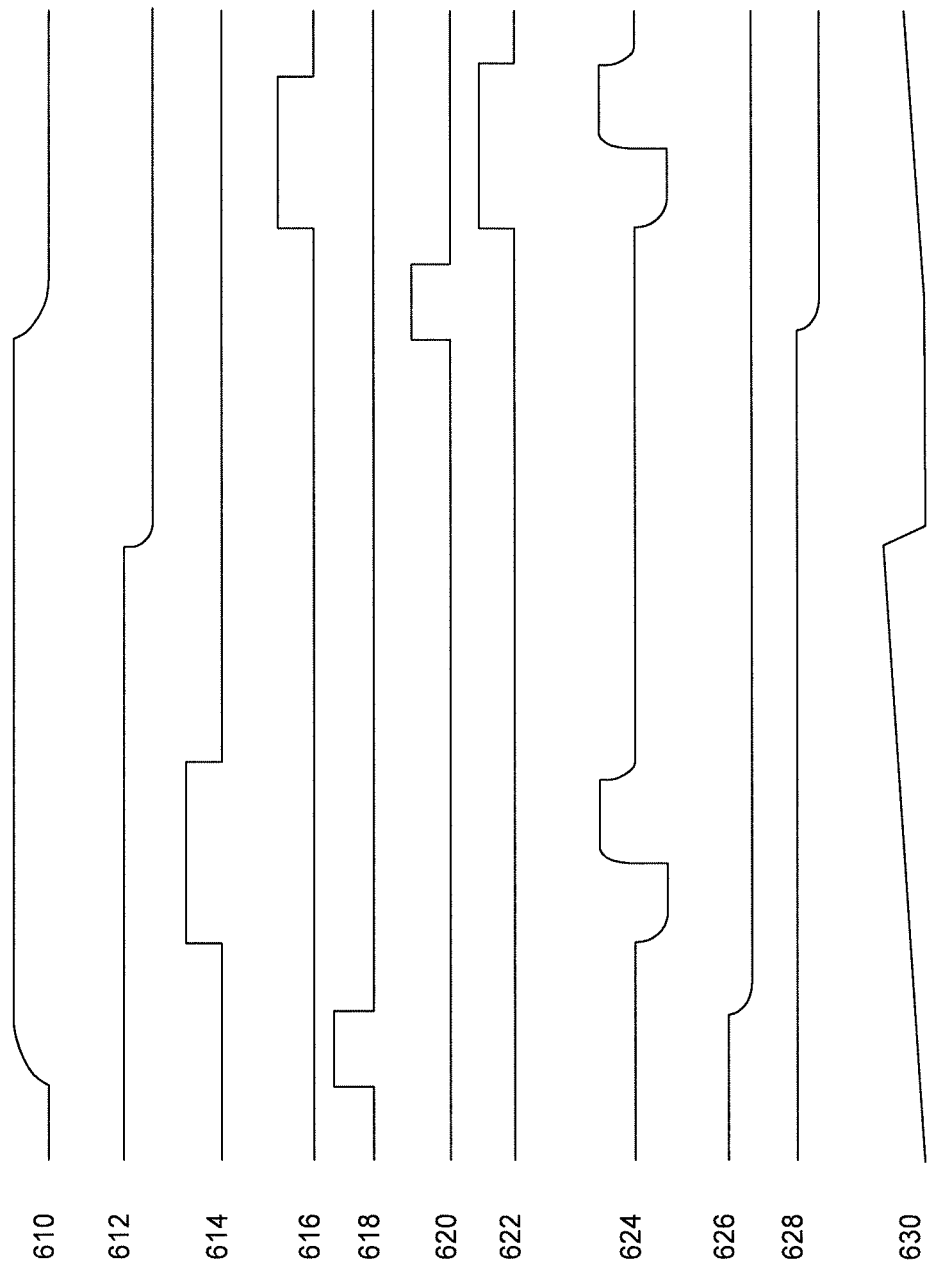
FIG. 6 illustrates a timing diagram for display updating and photodiode circuitry readout, according to one or more embodiments.

FIG. 4 illustrates a method 400 for determining fingerprint data and authenticating a user, according to one or more embodiments. At operation 410, a first photodiode circuitry is selected for readout. For example, the selection circuitry 270 may drive the select line 250a with a select signal to select the photodiode circuitry $203_{1,1}$ to read the charge stored on the corresponding storage capacitor. FIG. 6 illustrates an example select signal 614. In one embodiment, the selection circuitry 270 may receive a control signal from display driver 205 which instructs selection circuitry 270 to select the photodiode circuitry $203_{1,1}$ for readout. In one or more embodiment, the control signal is a clock signal and the selection circuitry 270 selects the select lines 250 in response to rising edges of the clock signal and deselects the select lines 250 in response to a falling edge of the clock signal. For example, select line 250a may be selected in response to a first rising edge of the clock signal and deselected in response to a first falling edge of the clock signal. Further, the select lines 250 may be independently addressable, and the control signal may provide an indication to the selection circuitry 270 as to which select line 250 is to be driven with a photodiode select signal.

The selection circuitry 270 may sequentially select each select line 250 on a one-at-a-time basis. Further, the selection circuitry 270 may select the select lines 250 in a non-sequential order.

In one or more embodiments, the selection circuitry 270 may be configured to simultaneously drive multiple select lines 250 with a select signal to simultaneously select multiple photodiode circuitries 203 in multiple rows for readout. For example, the photodiode circuitries 203 coupled to select lines 250a-250c may be simultaneously selected for readout. Simultaneously selecting multiple photodiode circuitries 203 over various different rows may allow the selected photodiodes to function as one larger sensor, which may increase the sensing rate.

The sensing rate may correspond to the rate at which fingerprint sensing is performed. The sensing rate may correspond to the rate at which photodiode circuitries 203 are selected for readout. Further, the sensing frame rate may correspond to a rate at which one or more fingerprint images are acquired.

In one or more embodiments, before each photodiode circuitry 203 is selected for readout, the photodiode circuitries 203 are driving with a pre-bias signal via a corresponding bias line 220. The pre-bias signal may be a voltage signal and driving the photodiode circuitries 203 with the pre-bias signal may place the photodiodes 206 and corresponding storage capacitors at a predetermined voltage potential before the photodiode circuitries 203 are connected to be readout.

In one embodiment, a first voltage is driven on a first bias line 220 and the corresponding monitor line 260 to measure the charge stored on the storage capacitor of the corresponding photodiode circuitry 203. In such an embodiment, the measurement of the charge stored on the storage capacitor is a differential measurement. In one embodiment, the bias line 220 may be driven with a bias signal to generate a voltage difference between the bias line 220 a corresponding monitor line 260. In such an embodiment, as the storage capacitor is charged, the charge on the storage capacitor may equal the estimated or expected voltage difference between the bias line 220 and the monitor line 260 to minimize offsets or leakage through selection transistors. In one embodiment, a measurement of the charge stored on the storage capacitor is determined during a first period and during a second period the bias line 220 and corresponding monitor line 260 may be driven with different voltages to cancel out, or null, the measurement of the charge stored on the storage capacitor.

A measurement of the charge stored on the storage capacitor may be present when the stored charge exceeds the voltage difference between the bias line 220 and the monitor line 260.

In one or more embodiment, by using a pre-bias signal having a voltage level greater than system ground, the photodiodes 206 are less susceptible to fluctuations of the system ground and the settling time of the photodiode 206 may be reduced. With reference to FIG. 2, the display driver circuitry 208 may drive each photodiode 206 with a pre-bias signal via bias line 220. Alternatively, with reference to FIG. 3, the display driver circuitry 208 may drive each photodiode 206 with a pre-bias signal via one of the monitor lines 260.

At operation 420 of the method 400, a current signal is received from the photodiode circuitry. For example, a current signal may be received by the measurement circuitry 207 from the storage capacitor connected in parallel with the photodiode $206_{1,1}$ via the monitor line 260b. In one embodiment, the measurement circuitry 207 may receive and integrate the current signal from the storage capacitor, converting the current signal into a voltage value. The measurement circuitry 207 may apply one or more filters to the current signal to process the current signal.

At operation 430, fingerprint information of a first input object is determined. For example, the determination module 209 may receive the processed current signals from the measurement circuitry 207 and determine an amount of reflected light is received from each photodiode 206 from the processed current signals. The determination module 209 may generate fingerprint information from the amounts of reflected light received from each photodiode 206. Generating fingerprint information may include generating a fingerprint image. In one or more embodiments, each photodiode 206 may correspond to a different pixel of the fingerprint image. In other embodiments, each pixel of the fingerprint image may correspond to multiple photodiodes 206.

The method 400 may optionally include operation 440 where a first user data is authenticated based on the fingerprint information. For example, to authenticate a user, the determination module 209 may compare the fingerprint information to one or more user templates. Comparing the fingerprint information may include comparing a fingerprint image to the templates. Based upon a determination that the fingerprint information matches one or more of the user templates, the user may be authenticated and granted access to the corresponding input device. Further, based upon a determination that the fingerprint information does not match one or more of the user templates, the user may not be authenticated and access to the corresponding input device may be revoked.

Figure 5:
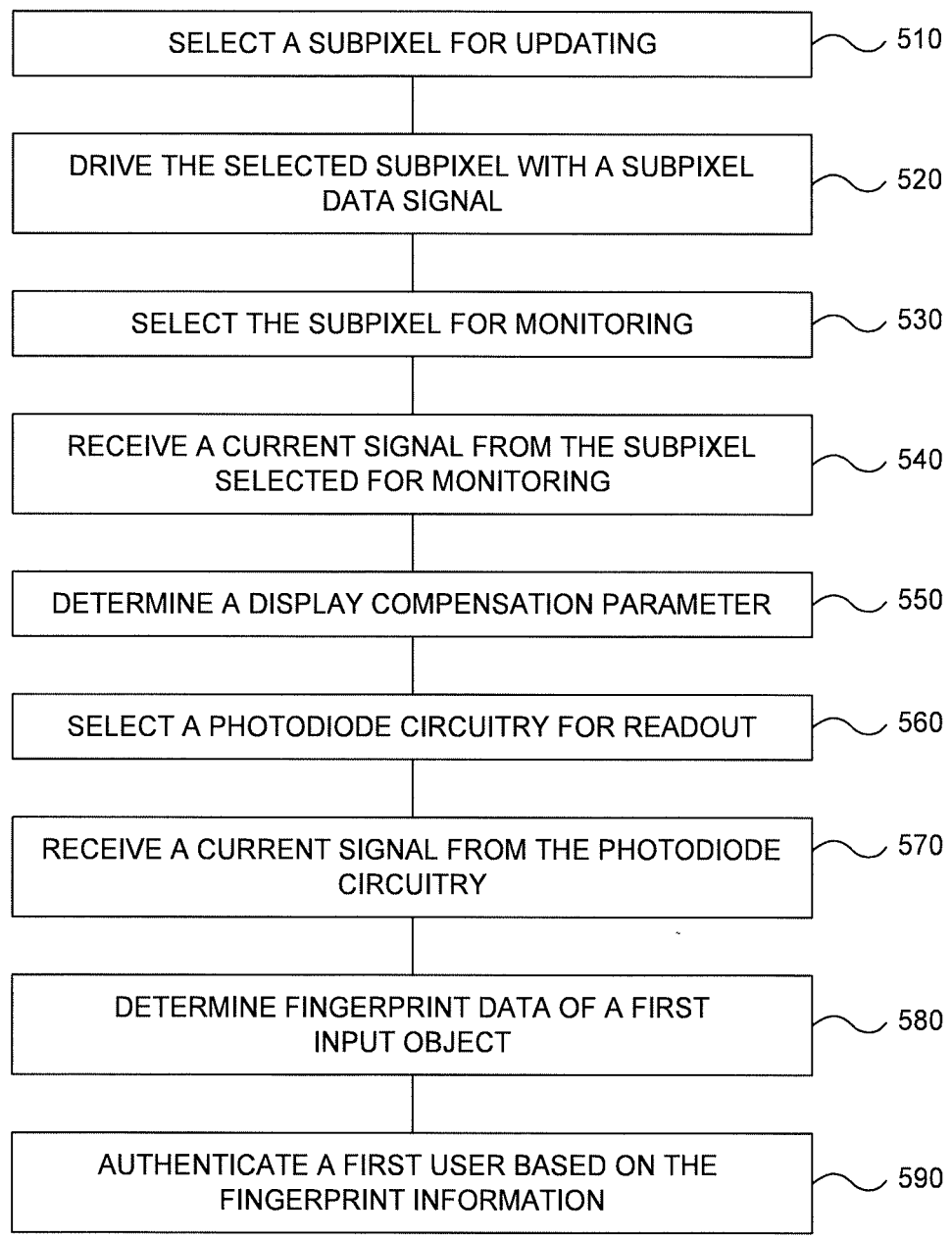
FIG. 5 illustrates a method for display updating and fingerprint sensing, according to one or more embodiments.

FIG. 5 illustrates a method 500 for compensating a display device and for performing fingerprint sensing, according to one or more embodiments. At operation 510, a subpixel is selected for updating. For example, the selection circuitry 262 may drive the gate line 240a with a gate select signal, e.g., the signal 618 of FIG. 6, to select the subpixel 280a for updating. The selection circuitry 262 may receive a control signal from display driver 205 which may instruct selection circuitry 262 to select the subpixel 280 for updating. In one or more embodiment, the control signal is a clock signal and the selection circuitry 262 drives the gate lines 240 in response to rising edges of the clock signal and deselects the gate lines 240 in response to a falling edge of the clock signal. For example, the gate line 240a may be selected in response to a first rising edge of the clock signal and deselected in response to a first falling edge of the clock signal. Further, the selection circuitry 262 may sequentially select each gate line 240 on a one-at-a-time basis. Further, the selection circuitry 262 may select the gate lines 240 in a non-sequential order.

At operation 520, the selected subpixel is driven with a subpixel data signal for updating. For example, the display driver circuitry 208 may be configured to drive the selected subpixel 280a with a corresponding subpixel data signal, e.g., the signals 610 of FIG. 6, for updating via source line 210a. The subpixel data signal may correspond to a brightness level of the subpixel 280a. In one or more embodiments, the display driver circuitry 208 simultaneously drives two or more subpixels 280 of a common row with respective subpixel data signals.

At operation 530, a subpixel is selected for monitoring. For example, the subpixel 280a may be selected for monitoring by the selection circuitry 270. The selection circuitry 270 may drive the select line 230a with a monitor select signal, e.g., the signal 614 of FIG. 6, to select the subpixel 280a for monitoring. The selection circuitry 270 may receive a control signal from display driver 205 which may instruct selection circuitry 270 to select the subpixel 280a for monitoring. In one or more embodiment, the control signal is a clock signal and the selection circuitry 270 selects the select lines 230 in response to rising edges of the clock signal and deselects the select lines 230 in response to a falling edge of the clock signal. For example, the select line 230a may be selected in response to a first rising edge of the clock signal and deselected in response to a first falling edge of the clock signal. Further, the select lines 230 may be independently addressable, and the control signal may provide an indication to the selection circuitry 270 as to which select line 230 is to be driven with a select signal. The selection circuitry 270 may sequentially select each select line 230 on a one-at-a-time basis. Further, the selection circuitry 270 may select the select lines 230 in a non-sequential order. Each subpixel may be selected once during each display frame or once every "N" display frames, where "N" is a positive integer. Further, different subpixels 280 may be selected during each display frame, such that the subpixels 280 are selected once every "N" display frames, where "N" is a positive integer.

At operation 540, a current signal is received from the subpixel selected for monitoring. For example, a current signal, e.g., the signal 624, may be received by the measurement circuitry 207 from the subpixel circuitry $202_{1,1}$ of the subpixel 280a via the monitor line 260a. The measurement circuitry 207 may receive and integrate the current signal from the subpixel circuitry $202_{1,1}$, and measure the amount of current to determine an amount of current that is flowing into the corresponding OLED. In one embodiment, while the subpixel 280a is selected for monitoring, the monitor line 260a may be set to a low voltage and a low impendence to measure the current flowing out of a drive transistor of the subpixel 280a and the monitor line 260a may be set to a high voltage and a high impedance to measure the current flowing out of the OLED $204_{1,1}$. The signal 624 is an example of the signal driven on the monitor line 260a.

The measurement circuitry 207 may convert the current signal into a voltage value (e.g. by accumulating charge on a feedback capacitor), and/or apply one or more filters to the current signal to process the current signal.

At operation 550, a display compensation parameter is determined. For example, the determination module 209 may determine one or more display compensation parameters for the subpixel 280a from the current signal received by the measurement circuitry 207. The determination module 209 may compare the measured current value to an expected current value. Based on the comparison, the determination module 209 may determine the subpixel data signal driven on the subpixel 280a may need to be increased to ensure that the actual brightness of the subpixel 280a matches the expected brightness. For example, the determination module 209 may instruct the display driver circuitry 208 to overdrive (e.g., increase the level of the corresponding subpixel data signal) the subpixel 280a, when the subpixel 280a is selected for updating. Alternately, the entire panel may be under driven to minimize overdrive of some fraction of pixels. The determination module 209 may determine a different display compensation parameter for each subpixel 280, or apply a common display compensation parameter to a group of subpixels 280.

At operation 560, a photodiode circuitry is selected for readout. Operation 560 is completed similar to that of operation 410 of method 400. In one or more embodiments, the reflected light received by the photodiodes 206 corresponds to the light emitted by the subpixels 280 during display updating. Alternatively, one or more subpixels 280 may be configured to emit light for fingerprint sensing that differs from the light emitting for display updating. For example, the subpixels 280 may be driven with a maximum or near maximum brightness values when the corresponding display device is performing fingerprint sensing regardless of the brightness values driven on the subpixels 280 for display updating. In one embodiment, the photodiodes 206 charge a storage capacitor, e.g., the storage capacitor 156, in response to the received light.

At operation 570, a current signal is received from the selected photodiode circuitry. Operation 570 is completed similar to that of operation 420 of method 400. In one or more embodiments, the current received from the photodiode circuitries 203 occurs during a period that is non-overlapping with when the current is received from subpixel circuitries 202. Alternatively, current may be received from one or more photodiode circuitries 203 during a period that at least partially overlaps with the timing of when current is received form one or more selection circuitries 202. For example, current may be received from a photodiode circuitry $203_{1,1}$ and subpixel circuitry $202_{2,1}$, as the photodiode circuitry $203_{1,1}$ and the subpixel circuitry $202_{2,1}$ are coupled to different monitor lines 260. Hence, the current signal received from photodiode circuitry $203_{1,1}$ will not interfere with the current signal receive subpixel circuitry $202_{2,1}$.

At operation 580, fingerprint information for the first input object is determined. Operation 580 is completed similar to that of operation 430 of method 400. Further, at operation 590, a first user is authenticated based on fingerprint information. Operation 580 is similar to that of operation 440 of method 400.

FIG. 6 illustrates a timing diagram for updating the display device 200 and measuring the photodiode circuitries 203, according to one or more embodiments. The signal 610 is a data signal driven on a first one of source lines 210 to update the selected subpixel 280 coupled to the source line 210. The signal 618 is driven on one of the gate line 240 to select a subpixel 280 to be updated by the signal 610. The signal 620 illustrates the gate select signal for another gate line 240 and occurs after the signal 618 transitions low.

The signal 612 is a pre-charge signal driven on a first one of the bias lines 220 to pre-charge a corresponding storage capacitor, e.g., storage capacitor 156. The signal 614 is driven onto select line 230 to select a corresponding subpixel circuitry 202 for measurement and the signal 624 is driven on the corresponding monitor line 260. During a first portion of the signal 624 a low voltage is driven on the monitor line 260, allowing a current flowing out of the drive transistor, e.g., the drive transistor 134, to be measured by the measurement circuitry 207 and during a second portion of the signal 624 a high voltage is driven on the monitor line to allow the current of the corresponding OLED 204 to be measured by the measurement circuitry 207. In one embodiment, the signal 614 is driven high after the signal 618 is driven low. The signal 616 shows the selection of a next subpixel circuitry 202 for readout. The signal 622 selects a next corresponding photodiode circuitry 203 for readout. For example, while the signal 622 is at a high voltage the charge stored on a storage capacitor, e.g., the storage capacitor 156 may be output to the measurement circuitry 207 to be measured. For example, signal 630 illustrates the integration time and measurement time for one of the photodiodes 206. As is illustrated by signal 630, in response to measuring the charge stored on the storage capacitor, the storage capacitor is reset.

Signals 626 and 628 illustrate the amount of current provided to the storage capacitors, e.g., the storage capacitor 136, of corresponding subpixel circuitries 202 from display frame to display frame.

Figure 7:
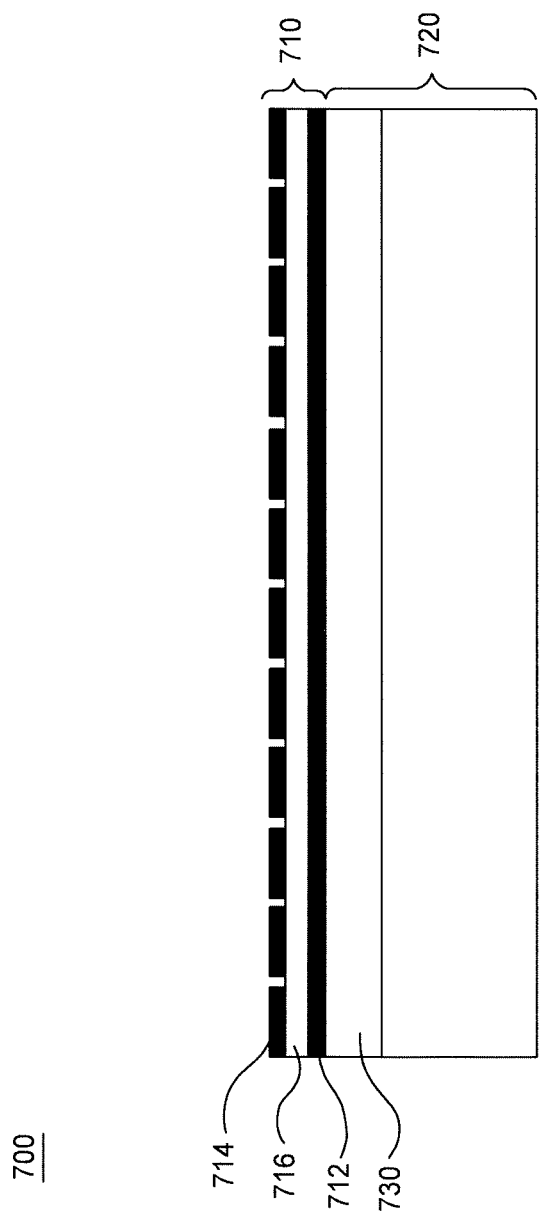
FIG. 7 illustrates a side view of an example input device, according to one or more embodiments.

FIG. 7 illustrates an input device 700, according to one or more embodiments. The input device 700 includes a capacitive sensing device 710 disposed over a display device 720. The display device 720 maybe configured similar to that of the display device 200 or 300. For example, as is illustrated in FIG. 7, the capacitive sensing device 710 includes sensor electrodes 712 and 714.

In one embodiment, a capacitive sensor driver may be utilized to operate the sensor electrodes 712, 714 for capacitive sensing. The capacitive sensor driver may part of the display driver 205 or separate from the display driver 205. In one or more embodiments, the capacitive sensor driver is part of an IC chip separate from the IC chip of the display driver 205. The capacitive sensor driver may include hardware and firmware elements configured to drive the sensor electrodes 712, 714 to acquire sensor data and to process the sensor data to determine changes in capacitive coupling and/or positional information for an input object. For example, the capacitive sensing device 710 may include one or more amplifiers configured to drive sensing signals onto sensor electrodes and AFEs configured to receive resulting signals from sensor electrodes. In one or more embodiments, the capacitive sensing device 710 may be configured to acquire sensor data from the sensor electrodes by operating the sensor electrodes for capacitive sensing. The sensor data may correspond to resulting signal received with one or more sensor electrodes.

In one embodiment, a first portion of the sensor electrodes may be driven with transmitter signals such that they are operated as transmitter electrodes, and a second portion of the sensor electrodes may be utilized to receive resulting signals such that they operated as receiver electrodes, to perform transcapacitive sensing. For example, the sensor electrodes 712 may be operated as transmitter electrodes and the sensor electrodes 714 may be operated as receiver electrodes. In another example, the sensor electrodes 712 may be operated as transmitter electrodes and the sensor electrodes 714 may be operated as receiver electrodes.

The capacitive sensing device 710 may be configured to drive the transmitter electrodes with a transmitter signal that is modulated relative to the receiver electrodes. For example, the transmitter signal may be a varying voltage signal that varies between at least two voltages. In one embodiment, the transmitter signal includes a plurality of sensing bursts, where each sensing bursts includes a plurality of voltage transitions. The capacitive sensing device 710 may be configured to maintain the receiver electrodes at a substantially constant voltage or modulate the receiver electrodes when performing capacitive sensing. In one embodiment, when the receiver electrodes are modulated, the transmitter electrodes are modulated relative to the receiver electrodes, such that the transmitter electrodes are modulated at a different phase, polarity, amplitude, and/or frequency than the receiver electrodes. The capacitive sensing device 710 receives resulting signals with the receiver electrodes and measures the resulting signals to determine a change in capacitive coupling between the receiver electrodes and the transmitter electrodes.

The capacitive sensing device 710 may be configured to drive each of the transmitter electrodes one at a time, or simultaneously drive at least two of the transmitter electrodes. In one embodiment, the capacitive sensing device 710 is configured to simultaneously drive at least two transmitter electrodes with different transmitter signals based on different codes or frequencies.

The sensor electrodes 712, 714 may be operated for absolute capacitive sensing by the capacitive sensing device 710. In such an embodiment each of the 712, 714 may be modulated relative to a reference voltage (e.g., system or device ground) with an absolute capacitive sensing signal by the capacitive sensing device 710, and the capacitive sensing device 710 may receive resulting signals from the modulated sensor electrodes. The capacitive sensing device 710 may be configured to determine changes in a capacitive coupling between each modulated sensor electrode and an input object from the resulting signals. In one embodiment, all of sensor electrodes 712,714 may be simultaneously operated for absolute capacitive sensing, such that a different resulting signal is simultaneously received from each of the sensor electrodes or a common resulting signal from two or sensor electrodes. In another embodiment, the sensor electrodes 712 may be operated for absolute capacitive sensing during a first period and sensor electrodes 714 may be operated for capacitive sensing during a second period that is non-overlapping with the first period.

In various embodiments, the sensor electrodes 712, 714 may be substantially rectangular in shape. In other embodiments, the sensor electrodes may have other shapes. Further, each of the sensor electrodes 712, 714 may have the same shape and/or size. In other embodiments, at least one sensor electrode may have a different shape and/or size than another sensor electrode.

In one or more embodiments, the sensor electrodes 712 and/or 714 may be disposed on a lens of the display device 720. For example, as illustrated in FIG. 7, the sensor electrodes 712 may be disposed on lens 730 of the display device 720. In one embodiment, each of the sensor electrodes 712, 714 may be disposed on a common substrate which is adhered to the lens 730. In such an embodiment, the sensor electrodes 712, 714 may be disposed in a common layer. For example, the sensor electrodes 712, 714 may be disposed in an array, where the sensor electrodes do not intersect with each in the sensing area of the input device 600. Alternatively, one of the sensor electrodes 712 and/or 714 may include jumpers patterned on a separate layer which crossover respective ones of the other one of sensor electrodes. The jumpers are insulated from the sensor electrodes that the jumpers crossover such that they don't ohmically couple to those sensor electrodes.

In another embodiment, the sensor electrodes 712 may be disposed on a first layer, and sensor electrodes 714 may be disposed on a second layer different from the first layer. For example, as illustrated in FIG. 7, the sensor electrodes 712 may be disposed on the lens 730 and the sensor electrodes 714 may be disposed on the substrate 716. In such an embodiment, the substrate 716 may be adhered to lens 730 by an optically clear adhesive (OCA).

In one embodiment, the sensor electrodes 712 and 714 are both disposed on different sides or a common side of the substrate 716 which is then adhered to lens 730. In another embodiment, the sensor electrodes 712 are disposed on a first substrate and the sensor electrodes 714 are disposed on a second substrate, and both substrates are coupled to the lens 730.

The sensor electrodes 712 and/or 714 may span across at least a portion of a sensing region of the capacitive sensing device 710. In one embodiment, each sensor electrode of the sensor electrodes 712, 714 spans the entire distance across the sensing region of the capacitive sensing device 710.

The capacitive sensing device 710 may be configured to determine area of localized capacitive sensing for each sensor electrode 712 and/or 714 or between the sensor electrodes 712 and 714. Areas of localized capacitive sensing of capacitive couplings may be termed "capacitive pixels." Capacitive pixels may be formed between an individual sensor electrode and a reference voltage in embodiments employing absolute capacitive sensing methods and between and between groups of sensor electrodes used as transmitter and receiver electrodes in embodiments employing transcapacitive sensing methods.

A set of measurements between sensor electrodes or between sensor electrodes and an input object may be utilized to from the capacitive pixels of a "capacitive image" or points along one or more capacitive profiles (also "capacitive frame").

In one or more embodiments, capacitive sensing (or input sensing) and display updating may occur during at least partially overlapping periods. For example, as the display device 720 is driven for display updating, the sensor electrodes 712, 714 may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display line update period. In one embodiment, the non-display update period occurs between display line update periods of a frame and is long enough to allow for multiple transitions of the transmitter signal to be driven onto the sensor electrodes. In other embodiments, the non-display update period may comprise horizontal blanking periods and vertical blanking periods.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A display device comprising:
a plurality of source lines;
a plurality of monitor lines;
a plurality of gate lines;
a plurality of select lines;
a plurality of subpixels, wherein a first subpixel of the plurality of subpixels comprises:
first subpixel circuitry comprising:
a first transistor coupled to a first source line of the plurality of source lines, and having a gate coupled to a first gate line of the plurality of gate lines; and
a second transistor coupled to a first monitor line of the plurality of monitor lines and having a gate coupled to a first select line of the plurality of select lines; and
first photodiode circuitry comprising:
a third transistor coupled to a second select line of the plurality of select lines;
a fourth transistor coupled to the second select line and the first monitor line; and
a photodiode coupled between the third transistor and the fourth transistor;
measurement circuitry coupled to the first subpixel via the first monitor line, the measurement circuitry is configured to:
receive a first current signal from the first subpixel circuitry during a first period via the first monitor line;
receive a second current signal from the first photodiode circuitry during a second period via the first monitor line; and
determine fingerprint data from the second current signal.

2. The display device of claim 1, the first photodiode circuitry is further coupled to a first bias line.

3. The display device of claim 1, wherein the first photodiode circuitry is further coupled to a second monitor line of the plurality of monitor lines.

4. The display device of claim 1, wherein the plurality of subpixels further includes a second subpixel, wherein the second subpixel comprises:
second subpixel circuitry coupled to a second source line of the plurality of source lines, a second monitor line of the plurality of monitor lines, and the first gate line; and
a second photodiode circuitry coupled the first select line.

5. The display device of claim 4, wherein the first photodiode circuitry is further coupled to the second monitor line.

6. The display device of claim 4, wherein the first period and the second period are non-overlapping.

7. A display driver for a display device, the display driver comprising:
display driver circuitry coupled to a first subpixel circuitry of a first subpixel the display device via a source line, the display driver is configured to drive a subpixel data signal onto the first subpixel circuitry via the source line to update the first subpixel, wherein the first subpixel circuitry comprises:
a first transistor coupled to the source line and having a gate coupled to a first gate line; and
a second transistor coupled to a first monitor line and having a gate coupled to a first select line; and
measurement circuitry coupled to the first subpixel circuitry and a first photodiode circuitry of the first subpixel via the first monitor line, the first photodiode circuitry comprises a third transistor and a fourth transistor coupled to a second select line, and a photodiode coupled between the third transistor and the fourth transistor, wherein the fourth transistor is further coupled to the first monitor line, and wherein the measurement circuitry is configured to:
receive a first current signal from the first subpixel circuitry during a first period via the first monitor line; and
receive a second current signal from the first photodiode circuitry during a second period via the first monitor line.

8. The display driver of claim 7 further comprising a determination module configured to determine fingerprint information from the second current signal.

9. The display driver of claim 8, wherein the determination module is further configured to authenticate a first user based on the fingerprint information.

10. The display driver of claim 7, wherein the measurement circuitry is further configured to determine a compensation parameter based on the first current signal, and wherein the display driver circuitry is further configured to drive the first subpixel with the compensation parameter for display updating.

11. The display driver of claim 7, wherein the display driver circuitry is further configured to drive a bias voltage onto the first photodiode circuitry via a bias line.

12. The display driver of claim 7, wherein the display driver circuitry is further configured to drive a bias voltage onto the first photodiode circuitry via a second monitor line.

13. The display driver of claim 7, wherein the measurement circuitry is further configured to:
receive a third current signal from a second subpixel circuitry of a second subpixel during a third period via a second monitor line; and
receive a fourth current signal from a second photodiode circuitry of the second subpixel during a fourth period via the second monitor line.

14. The display driver of claim 13, wherein the first period and the second period are non-overlapping.

15. A method for performing fingerprint sensing, the method comprising:
selecting a first photodiode circuitry of a first subpixel of a display device for readout during a first period by driving a first select line coupled to a first transistor and a second transistor of the first photodiode circuitry with a first select signal, wherein the first photodiode circuitry comprises a photodiode coupled between the first transistor and the second transistor;
receiving a first current signal from the first photodiode circuitry via a first monitor line coupled to the second transistor of the first photodiode circuitry, wherein the first monitor line is further coupled to a third transistor of a first subpixel circuitry of the first subpixel, the first subpixel circuitry comprises a fourth transistor coupled to a source line of the display device and having a gate coupled to a first gate line; and
determining fingerprint information of a first input object from a measurement of the first current signal.

16. The method of claim 15, further comprising:
selecting the first subpixel circuitry for readout during a second period by driving a second select line of the display device with a second select signal, the second select line is coupled to the third transistor;

receiving a second current signal from the first subpixel circuitry via the first monitor line; and determining a display compensation parameter from a measurement of the second current signal.

17. The method of claim 16, wherein the first period and the second period are non-overlapping.

18. The method of claim 15, further comprising authenticating a first user based on the fingerprint information.

19. The method of claim 15, further comprising driving a bias voltage onto the first photodiode circuitry via a bias line.

20. The method of claim 15, further comprising driving a bias voltage onto the first photodiode circuitry via a second monitor line.

* * * * *